Oct. 1, 1929.  R. H. SIMONDS ET AL  1,729,901
MANUFACTURE OF SPECTACLE FRAMES
Filed Jan. 17, 1925   2 Sheets-Sheet 1
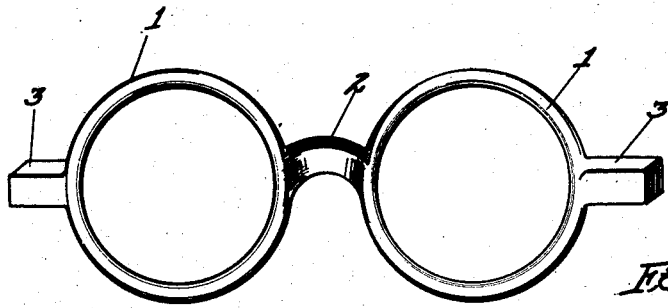
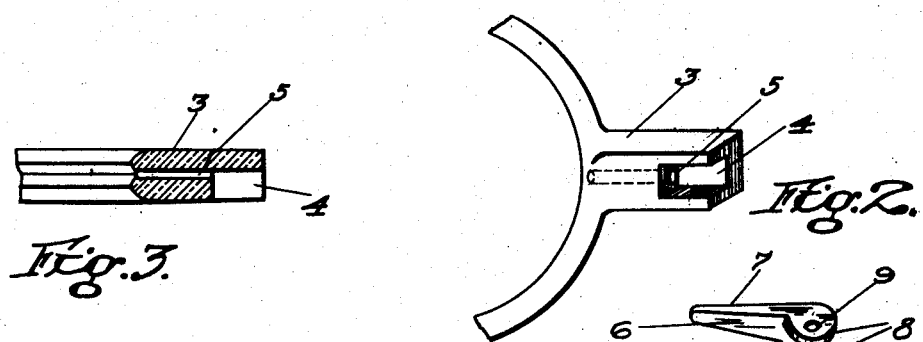
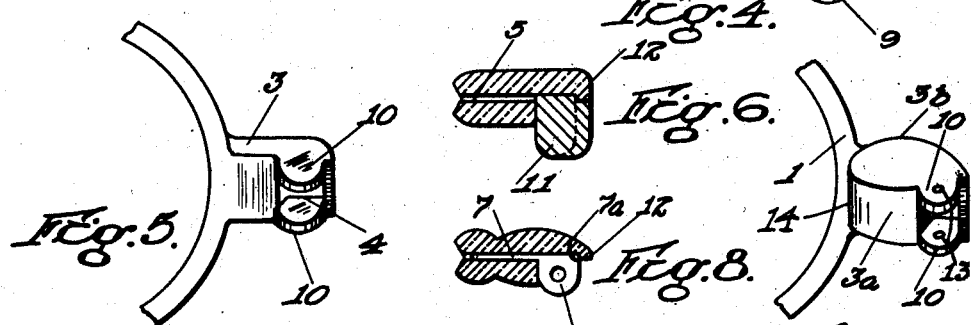
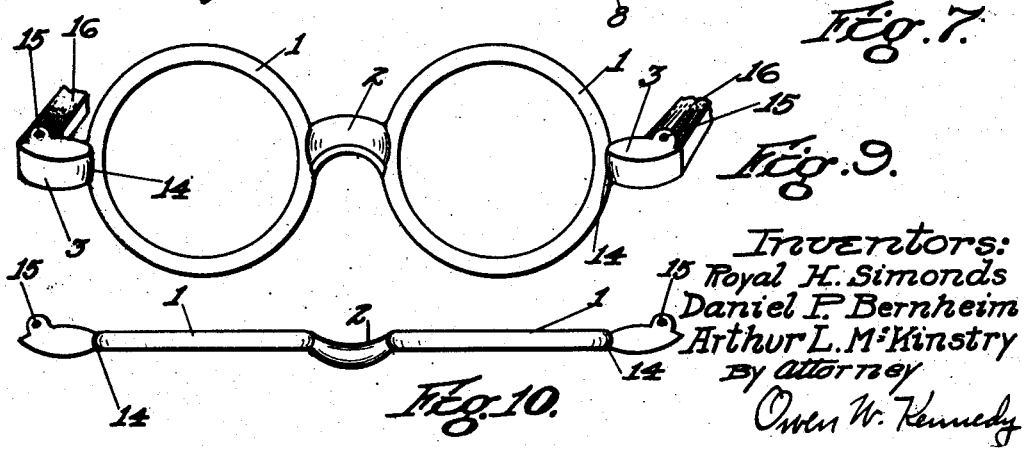
Inventors:
Royal H. Simonds
Daniel P. Bernheim
Arthur L. McKinstry
By Owen W. Kennedy
Attorney Oct. 1, 1929.

R. H. SIMONDS ET AL 1,729,901

MANUFACTURE OF SPECTACLE FRAMES

Filed Jan. 17, 1925   2 Sheets-Sheet 2

Inventors:
Royal H. Simonds
Daniel P. Bernheim
Arthur L. McKinstry
By Attorney
Owen W. Kennedy Patented Oct. 1, 1929

1,729,901

UNITED STATES PATENT OFFICE

ROYAL H. SIMONDS, DANIEL P. BERNHEIM, AND ARTHUR L. McKINSTRY, OF SOUTH-BRIDGE, MASSACHUSETTS, ASSIGNORS TO SIMONDS OPTICAL COMPANY, OF SOUTH-BRIDGE, MASSACHUSETTS, A CORPORATION OF MASSACHUSETTS

MANUFACTURE OF SPECTACLE FRAMES

Application filed January 17, 1925. Serial No. 3,046.

Our invention relates to the manufacture of frames for holding the lenses of eye glasses, such frames being commonly known in the art as spectacle frames, or fronts. Our invention has particular reference to non-metallic spectacle frames made of compositions resembling natural shell in appearance, such compositions usually being of a synthetic nature chemically, and being adapted to be readily worked, either cold, or when in a heated and more or less plastic condition.

In the fabrication of spectacles embodying non-metallic frames, it is customary to pivotally connect suitable temples to the ends of a frame, such temples being usually of the same material as the frame, while the pivotal connections, or hinges, are of metal. In the incorporation of metallic hinge members for the temples in a non-metallic frame, difficulties have heretofore been encountered in permanently anchoring the hinge members, and in effectively concealing the metal parts in order that the assembled frame and temples will present a finished appearance on the wearer.

According to the present invention, we provide an improved method of manufacturing non-metallic spectacle frames of the above described type, whereby the metallic hinge members for the temples are permanently incorporated in the non-metallic material of the frames in such a manner that the hinge members are substantially hidden from view when the temples are attached to the frame. Our invention also contemplates an improved non-metallic spectacle frame which is superior in appearance to non-metallic frames as heretofore manufactured, and is capable of being readily adjusted to give the temples carried thereby the proper setting, or angle, with respect to the lenses. The above and other advantageous features of our invention will hereinafter more fully appear, reference being had to the accompanying drawings in which Fig. 1 is a perspective view illustrating the appearance of a spectacle frame prior to the carrying out of our improved method of manufacture.

Fig. 2 is an enlarged perspective view of a portion of the frame shown in Fig. 1, illustrating the initial steps of our improved method.

Fig. 3 is a horizontal sectional view of the frame portion shown in Fig. 2.

Fig. 4 is an enlarged perspective view of the metallic hinge member which is to be incorporated in the frame shown in Fig. 2.

Fig. 5 is a view similar to Fig. 2, showing the appearance of the frame after the performance of the upsetting operation.

Fig. 6 is a horizontal sectional view of the frame portion shown in Fig. 5.

Fig. 7 is a view similar to Fig. 2, showing the appearance of the frame after the performance of the molding operation.

Fig. 8 is a horizontal sectional view of the frame portion shown in Fig. 7, with the hinge attached thereto.

Fig. 9 is a front perspective view showing the appearance of a completed spectacle frame with the temples attached thereto.

Fig. 10 is a plan view of the frame shown in Fig 8.

Like reference characters refer to like parts in the different figures.

Figure 11:
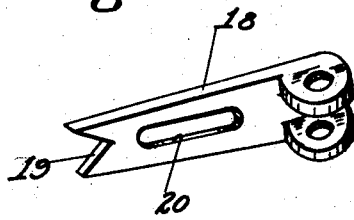
Fig. 11 is a perspective view similar to Fig. 4, illustrating a modified form of hinge member.

Referring first to Fig. 1, there is illustrated the appearance of a spectacle frame before the beginning of our improved method of manufacture, the frame consisting of annular lens receiving rim portions 1, 1, connected by a bridge portion 2, and with oppositely extending lugs or end pieces 3, 3, projecting therefrom which are originally substantially rectangular in cross section. The frame is composed of non-metallic material having the general appearance of natural shell, which material, while of a firm and unyielding nature when in a cold condition, is capable of being rendered more or less plastic by the application of heat. The exact composition of the material composing the frame forms no part of our invention, there being on the market at present a number of compositions such as zylonite, which possess the requisite properties.

In the practice of our invention the first step consists in cutting a slot 4 in each of the end pieces 3, the form of a slot 4 being shown in Fig. 2, in which only one of the end pieces 3 is shown on an enlarged scale. The slot 4 extends only part way into the end piece 3, and as best shown in Fig. 3, a hole 5 is drilled in the lug from the end of the slot 4 to the inner periphery of the lens receiving opening.

Referring now to Fig. 4, there is shown in perspective a hinge member 6 which is preferably formed from pressed metal and consists of a shank 7 terminating in a pair of spaced ears 8 which are generally circular in form and are provided with openings 9 in alinement with each other. The distance between the top and bottom surfaces of the ears 8 is substantially the same as the distance between the top and bottom of the slot 4, so that the hinge member 6 may be subsequently received in the end piece, after the upsetting and molding operations, which will now be described.

As best shown in Fig. 5, the upsetting operation, which is preferably carried on with the application of heat, results in displacing the material above and below the slot 4 in the end piece 3 and in forming this material into laterally projecting ears 10, 10. The ears 10, 10 have substantially the same form as the ears 8, 8 of the metallic hinge member 6 and the ears 10 are spaced apart substantially the same distance as the distance between the top and bottom surfaces of the ears 8. The upsetting operation is preferably preceded by the insertion of a suitable tool 11 in the slot 4, as shown in Fig. 6, which tool serves to support the material during the formation of the ears 10, and also serves to assist in the formation of a shoulder 12 between the ears 10 for a purpose to be hereinafter described.

Immediately following the upsetting operation, each end piece 3 is subjected to a molding operation which gives it the appearance shown in Fig. 7. The molding operation, which is preferably carried out with the application of heat, imparts a generally wedge-shaped form to each end piece 3 with gently swelling surfaces 3$^a$ and 3$^b$ extending between the ears 10, 10 and the rim portion 1. The shank 7 of a hinge member 6 is then inserted in the hole 5 between the ears 10 and the entire member 6 is pressed into the end piece until its ears 8 register with the ears 10, as shown in Fig. 8. As the ears 8 come into register with the ears 10, the end surface 7$^a$ of the shank 7, extending between the ears 8, slips by the shoulder 12 between the ears 10 and thereby locks the hinge member 6 in position in the end piece 3. If desired, the hole 5 may be filled with suitable cement before the insertion of the shank 7 so as to firmly secure the shank 7 therein, or the end piece 3 may be treated with a suitable solution which tends to soften the material to the extent that the forcible insertion of the hinge member 6 will cause it to be firmly embedded in the end piece 3. Before, or following the insertion of the hinge member 6, holes 13 are drilled in the ears 10 to register with the holes 9 in the ears 8, for receiving the hinge pin for the temple.

The completed frame then has the finished appearance of Fig. 9, the inserted hinge members 6 being entirely hidden when the frame is viewed from the front. It will be noted that the places where the end pieces 3 join the rim portions 1 are clearly defined by the lines 14 which is caused by the swelling of the end pieces away from the rim portions 1, thereby imparting a very pleasing appearance to the frame. It is apparent from a consideration of Figs. 9 and 10, that the only metal that is visible on a completed spectacle are the heads of the hinge pins 15 which serve to hold the hinge members of the temples 16 between the ears 8 of the frame hinge members.

As best shown in Fig. 10, the end pieces 3 have their smallest cross section at the points where they join the rims 1, so that the end pieces may be more readily "angled" to properly adjust the frame and temples to the nose and ears of the wearer. That is to say, each end piece 3 may be slightly bent out of the plane of its associated rim 1, so that the plane of the rims will be substantially vertical when the temples 16 are received over the ears. It is obvious that this angling may be accomplished without danger of breaking off the end pieces 3 by reason of the reinforcement provided by the embedded shanks 7 of the hinge members 6. As a matter of fact, angling results in a more or less permanent set being imparted to the shank of a hinge, so that when a frame has once been adjusted to the eyes of the wearer, the end pieces will always be at the proper angle.

Figure 12:
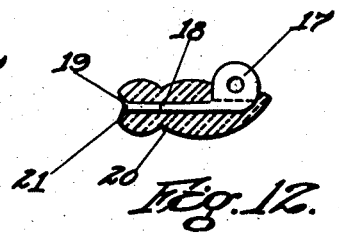
Fig. 12 is a horizontal sectional view similar to Fig. 3, showing the modified hinge member of Fig. 10 incorporated in the frame.

Referring now to Figs. 11 and 12, there is shown on an enlarged scale, a modified form of hinge member providing ears 17 and a shank 18 which is somewhat longer than the shank 7 of the member 6 and is split at its end, as indicated at 19. The shank 18 is also provided with a slot 20. The modified form of hinge is adapted to be inserted in the slotted end piece 3 of a frame in substantially the same manner as the hinge 6, the split end 19 of the hinge extending slightly into the lens receiving groove 21 provided in the rim portion 1. The softening of the material of the end piece results in the hinge being firmly embedded in the material thereof, which material enters into the slot 20 upon the application of pressure. In finishing a frame provided with a modified hinge member the split ends 19 of the holder are bent oppositely into the lens groove 21, as best shown in Fig. 12 thereby further anchoring the hinge and reinforcing the frame.

Referring now to Figs. 13 to 16 inclusive, there is illustrated a modification of the manner of incorporating a metallic hinge member in the end piece of a spectacle frame. The end piece 22 is provided with a slot 23 and a hole 24 in substantially the same manner as the end piece 3 shown in Fig. 2, after which a hinge member of the same form shown in Fig. 4 is inserted in the hole 24. As shown clearly in Fig. 13, the ears 25 of the hinge member project from the surface of the end piece 22 which is then subjected to an upsetting operation, which results in forcing the material of the end piece over the ears 25 and around the end of the hinge member. In this way the upsetting operation serves to permanently incorporate the metallic hinge member in the end piece, for it is obvious from an inspection of Fig. 14, that the hinge member is substantially surrounded by the non-metallic material.

Figures 13, 14, 15:
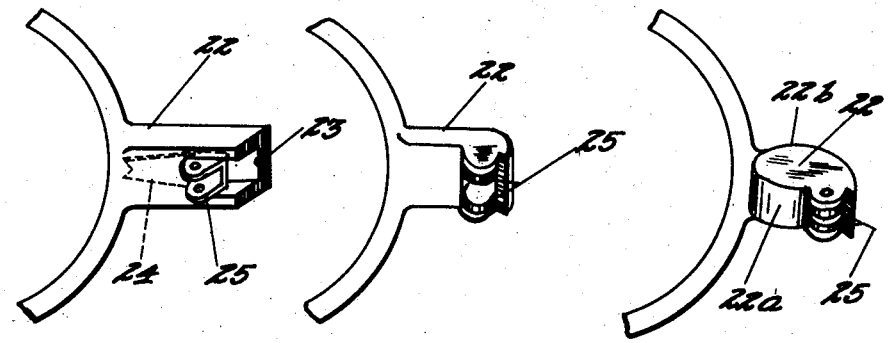
Figs. 13, 14 and 15 are enlarged perspective views similar to Figs. 5 and 7, illustrating a modification of the manner of attaching the hinge member to the frame.
Figure 16:
Fig. 16 is a plan view of the completed frame made in accordance with the modified method.

Immediately following the upsetting operation each end piece 22 is subjected to a molding operation which gives it the appearance shown in Figs. 15 and 16, with generally swelling surfaces 22$^a$ and 22$^b$ extending between the ears 25 and the rim portion 1. The completed frame then has substantially the same appearance as the completed frame shown in Fig. 10, the only noticeable difference being that in Fig. 16 the material of the end pieces 22 extends farther around the end of each hinge member, so as to firmly embed the latter.

From the foregoing it is apparent that by our invention we have provided an improved method of manufacturing non-metallic spectacle frames, by the practice of which frames are produced in which the amount of metal showing is reduced to a minimum. Frames manufactured in accordance with our invention are also most pleasing to the eye by reason of the molding of the end pieces, and also possess a high degree of mechanical strength which permits the end pieces to be readily angled without damage to the frame.

Figure 17:
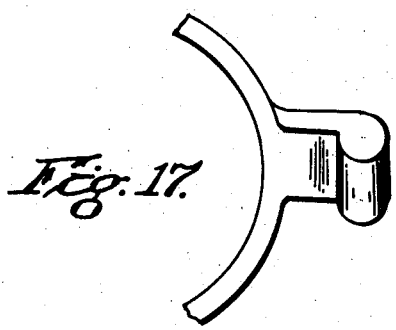
Fig. 17 is a view similar to Fig. 5, illustrating a further modification of our invention.

It is obvious that our method of manufacture may be modified further, for producing the same article, and without departing from our invention. For example, the end piece of a frame may be first upset, as shown in Fig. 17, after which the opening is provided for receiving the hinge member as previously described.

We claim,

1. The improvement in the manufacture of non-metallic spectacle frames comprising a pair of spaced rims, which consists in providing a recess in the end piece of a frame for the insertion of a metallic hinge member by movement in the plane of the adjacent rim, then upsetting the end piece to provide laterally extending ears above and below said recess, and finally in molding said end piece to provide gently swelling surfaces extending from the ears to the rim of the frame.

2. The improvement in the manufacture of non-metallic spectacle frames comprising a pair of spaced rims, which consists in providing a recess in the end piece of a frame for the insertion of a metallic hinge member by movement in the plane of the adjacent rim, then upsetting the end piece to provide laterally extending ears above and below said recess, and finally in molding said end piece to provide curved surfaces extending from said ears to the rim of the frame, the cross section of said end piece being reduced where it joins said rim.

3. The improvement in the manufacture of non-metallic spectacle frames each providing a pair of spaced rims with projecting end pieces originally rectangular in cross section, which consists in providing a recess in each end piece of a frame with the recess open at one side to permit the insertion of a metallic hinge member by movement in the plane of the adjacent rim, and then upsetting the said end piece to provide spaced ears projecting laterally from the face of the end piece above and below said recess to cover projecting portions of said hinge member.

ROYAL H. SIMONDS.
DANIEL P. BERNHEIM.
ARTHUR L. McKINSTRY.